United States Patent [19]
Luedtke

[11] Patent Number: 5,607,293
[45] Date of Patent: Mar. 4, 1997

[54] APPARATUS FOR SUPPLYING FUEL TO A FUEL TANK OF AN INTERNAL COMBUSTION ENGINE

[75] Inventor: Ulrich Luedtke, Karlsruhe, Germany

[73] Assignee: Robert Bosch GmbH, Stuttgart, Germany

[21] Appl. No.: 549,840

[22] PCT Filed: Mar. 9, 1995

[86] PCT No.: PCT/DE95/00326

§ 371 Date: Oct. 26, 1995

§ 102(e) Date: Oct. 26, 1995

[87] PCT Pub. No.: WO95/25885

PCT Pub. Date: Sep. 28, 1995

[30] Foreign Application Priority Data

Mar. 18, 1994 [DE] Germany .............................. 9404601 U

[51] Int. Cl.$^6$ .................................................. F02M 37/08
[52] U.S. Cl. ........................................ 417/423.7; 310/233
[58] Field of Search ................................. 310/233, 235, 310/237, 62; 417/423.7

[56] References Cited

U.S. PATENT DOCUMENTS

| | | | |
|---|---|---|---|
| 3,457,867 | 7/1969 | Komon | 417/423.7 X |
| 3,873,243 | 3/1975 | Nusser et al. | 417/368 |
| 4,433,263 | 2/1984 | Longhouse et al. | 310/233 |
| 4,580,334 | 4/1986 | McCracken et al. | 310/233 X |
| 5,338,992 | 8/1994 | Tsai | 417/423.7 X |

*Primary Examiner*—Richard E. Gluck
*Attorney, Agent, or Firm*—Michael J. Striker

[57] ABSTRACT

The unit has an electric motor (18) with a rotor (26) which is formed of an armature (40) and a plan commutator (32) and which is at least partially encased by a plastic casing (50, 62). The plan commutator (32) has a plurality of segments (52) which are separated from one another by slots (56) extending along the longitudinal axis (28) of the rotor (26) and which are connected with the armature (40). The casing (50) extends in the direction of the longitudinal axis (28) of the rotor (26) only so far that it does not cover the slots (56). Connection wires (60) for connecting with the armature (40) are arranged at the outer surfaces (54) of the segments (52). The casing (50) has portions (62) which extend in the direction of the longitudinal axis (28) of the rotor (26) over the base of the slots (56) until the connection wires (60) are covered by the portions (62). The portions (62) are so constructed that they have no undercuts away from a longitudinal center plane (70) containing the longitudinal axis (28) of the rotor (26) in directions normal to the longitudinal center plane (70).

6 Claims, 2 Drawing Sheets

5,607,293

APPARATUS FOR SUPPLYING FUEL TO A FUEL TANK OF AN INTERNAL COMBUSTION ENGINE

The invention is directed to a unit for conveying fuel from a supply tank to an internal combustion engine according to the generic part of claim 1.

A unit of this type is known from U.S. Pat. No. 3,873,243. This unit has a feed pump and an electric motor for driving a feed element of the feed pump. The electric motor has a rotor with an armature and a plan commutator arranged at one end. The armature and the plan commutator are partially encased by injection molded plastic. The plan commutator is formed by a plurality of segments which are connected with the armature so as to be electrically conductive and are separated from one another by slots extending along the longitudinal axis of the rotor. The sheathing or casing extends only so far in the direction of the longitudinal axis of the rotor that the slots between the segments of the plan commutator are not covered by it. If the slots were also covered by the casing it is possible that molten plastic could penetrate into the slots during fabrication of the casing thus jeopardizing the reliable operation of the rotor. The casing is required in order to minimize power losses of the electric motor brought about by the rotating movement of the armature and/or to protect the armature against electrochemical corrosion which would occur, for example, by operating the unit in alcohol.

The connection wires for connecting the plan commutator with the armature are conventionally arranged at the outer surface of the segments. In the interest of achieving the shortest possible construction of the unit, the plan commutator is constructed so as to be short enough in the direction of its longitudinal axis that the connection points of the connection wires extend closer to the end face of the plan commutator than the slot base. In the construction of the casing described above, the connection points of the connection wires at the segments of the plan commutator would not be covered by the casing and would therefore not be protected, so that electrochemical corrosion could occur and result in their destruction.

ADVANTAGES OF THE INVENTION

The unit according to the invention has the advantage over the prior art that the connection points of the connection wires at the segments of the plan commutator are also enclosed by the casing and are accordingly protected so as to ensure that no liquid plastic can penetrate into the slots during the fabrication of the casing. The casing can advantageously be produced in an injection molding die which is divided in a longitudinal center plane of the rotor. In this way the rotor can be removed from the die in a simple manner and the casing for a plurality of rotors can be manufactured in the injection molding die simultaneously.

Advantageous constructions and further developments of the invention are indicated in the dependent claims.

DRAWING

An embodiment example of the invention is shown in the drawing and described in more detail in the following description. FIG. 1 shows a unit for feeding fuel from a supply tank to the internal combustion engine in partial longitudinal section; FIG. 2 is an enlarged view of a rotor of the unit shown in FIG. 1; FIG. 3 shows a plan view of the rotor considered in the direction of arrow III in FIG. 2.

DESCRIPTION OF THE EMBODIMENT EXAMPLE

Figure 1:
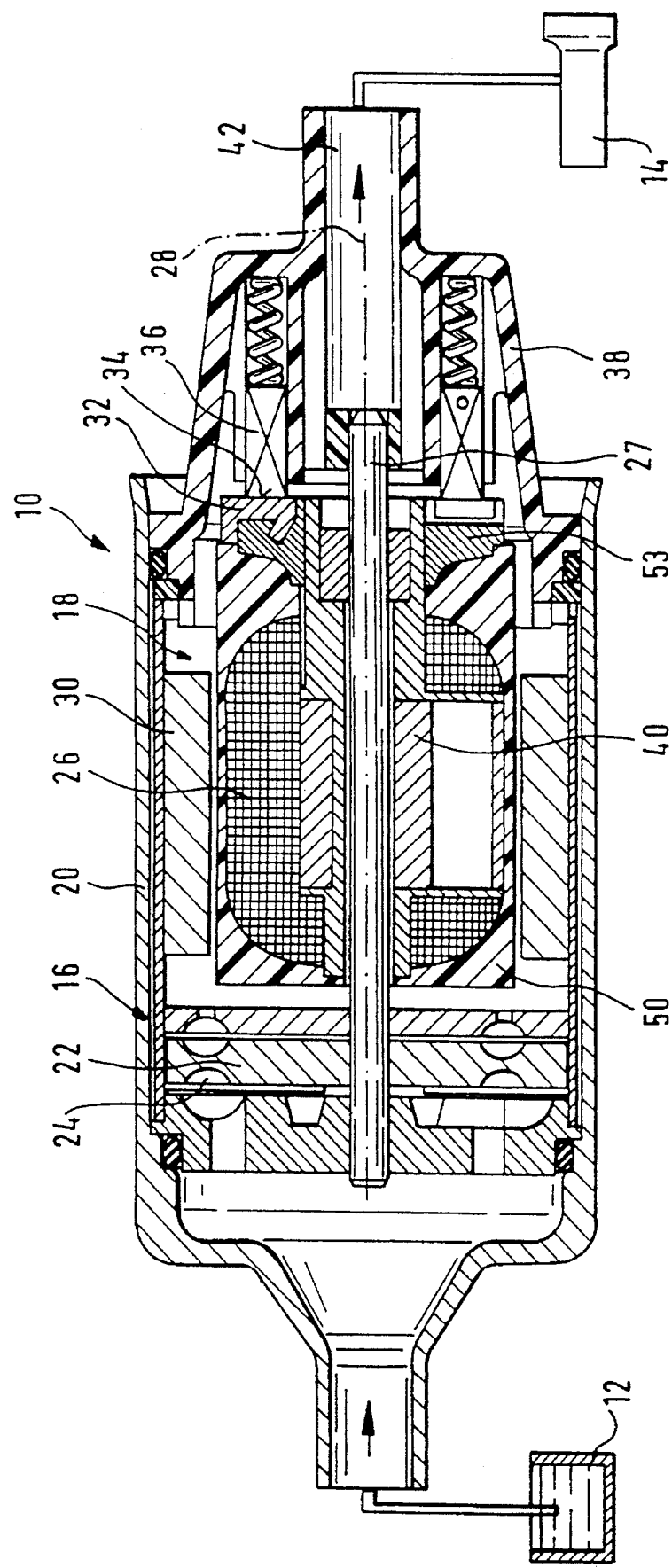

FIG. 1 shows a unit 10 for feeding fuel from a supply tank 12 to the internal combustion engine 14 of a motor vehicle. For example, the unit 10 can be arranged in the supply tank 12. The unit 10 has a feed pump 16 and an electric motor 18 for driving the feed pump 16. The feed pump 16 and the electric motor 18 are arranged adjacent to one another in a housing 20. The feed pump 16 has a feed element 22 which can be constructed, for example, as an impeller which is provided with vanes along its circumference and rotates in a pump chamber 24. The electric motor 18 has a rotor 26 with a shaft 27 by which it is supported so as to be rotatable about its longitudinal axis 28 and with which the feed element 22 of the feed pump 16 is connected in the rotating direction. Magnet segments are arranged in the housing 20 so as to be distributed along the circumference of the rotor 26.

The rotor 26 has a plan commutator 32 at its end remote of the feed pump 16. Brushes 36 which are arranged in a cover 38 closing the housing 20 contact the end face 34 of the plan commutator 32 extending vertically to the longitudinal axis 28 of the rotor 26. The plan commutator 32 is connected with windings of the armature 40 which make up a part of the rotor 18. During the operation of the unit 10, the feed element 22 is driven in rotation by the electric motor 16 so that the feed element delivers fuel which flows through the electric motor 18 and exits the unit 10 through an outlet 42 in the cover 38 to reach the internal combustion engine 14.

Figure 2:
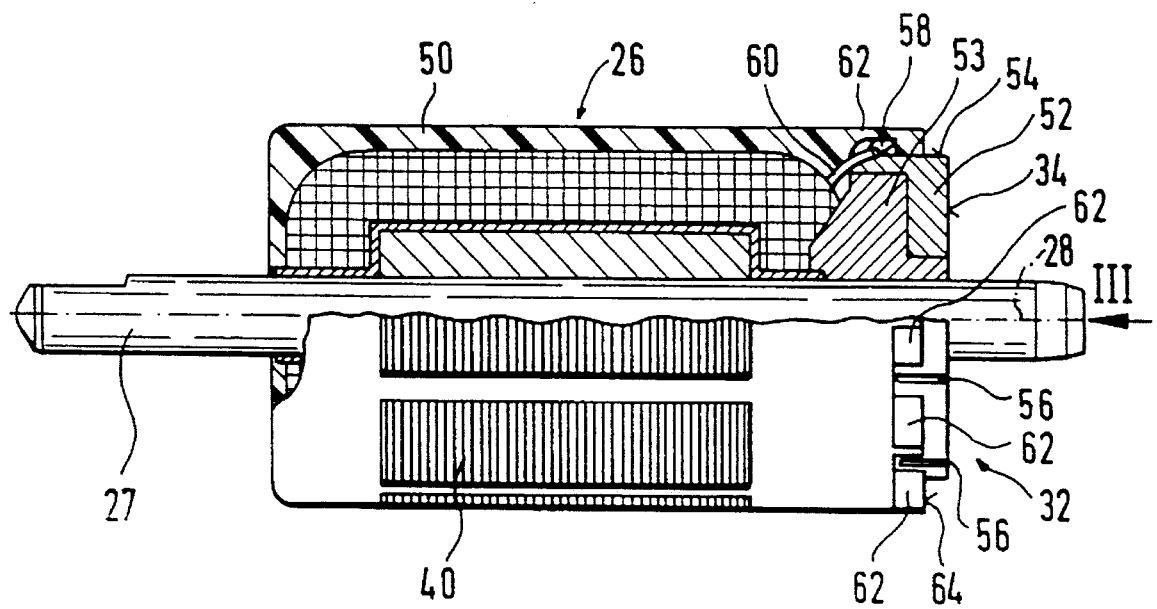

FIG. 2 is an enlarged view of the rotor 26 showing a sectional view above the longitudinal axis 28 and a plan view below the longitudinal axis 28. The rotor 26 is covered in the region of the armature 40 up to the edge of the plan commutator 32 by an injection molded plastic casing 50. The outer surfaces of the stack of plates of the armature 40 which are enclosed by the magnet segments 30 are not covered by the casing 50. The plan commutator 32 is formed of a plurality of segments 52, eight segments in the present embodiment example, which are arranged on a support 53. The outer surfaces 54 of the segments 52 are arranged roughly on a circular cylinder and the end faces 34 of the segments 52 approximately form a circular surface in a plane normal to the longitudinal axis 28 of the rotor 26. The segments 52 are divided from one another by slots 56 running parallel to the longitudinal axis 28 of the rotor 26 and extending up to the support 53. A hook 58 projects outward at the outer surface 54 of each segment 52 at its end region facing the armature 40. The hook 58 is bent in a roughly U-shaped manner and its free end extends approximately parallel to the longitudinal axis 28 so as to face away from the armature 40. The end of at least one connection wire 60 of the winding of the armature 40 is clamped at each hook 58. The slots 56 extend from the end face of the plan commutator 32 along the longitudinal axis 28 roughly to the height of the free ends of the hooks 58 or beyond the latter to the armature 40.

The casing 50 has an approximately circular-cylindrical outer shape and ends, in the direction of the longitudinal axis 28 in the circumferential regions of the rotor 26 in which the slots 56 are located, before the base of the slots 56 so that the latter are not covered by the casing 50. In the region of the slots 56, the casing 50 ends at the support 53. Between the slots 56, the casing 50 has portions 62 which extend in the direction of the longitudinal axis 28 until the hooks 60 are completely enclosed by the portions 62 of the casing 50.

The portions 62 also extend along the circumference of the segments 52 of the plan commutator 32 until the hooks 60 are completely by the casing [Translator's Note: The preceding sentence is incomplete in the original German]. The outer surfaces of the portions 62 of the casing 50 are arranged on the same circular cylinder as the other portion of the casing 50. The end faces 64 of the portions 62 facing away from the armature 40 extend roughly vertically to the longitudinal axis 28. The transitions between the end faces 64 and the outer surfaces of the portions 62 are rounded.

Figure 3:
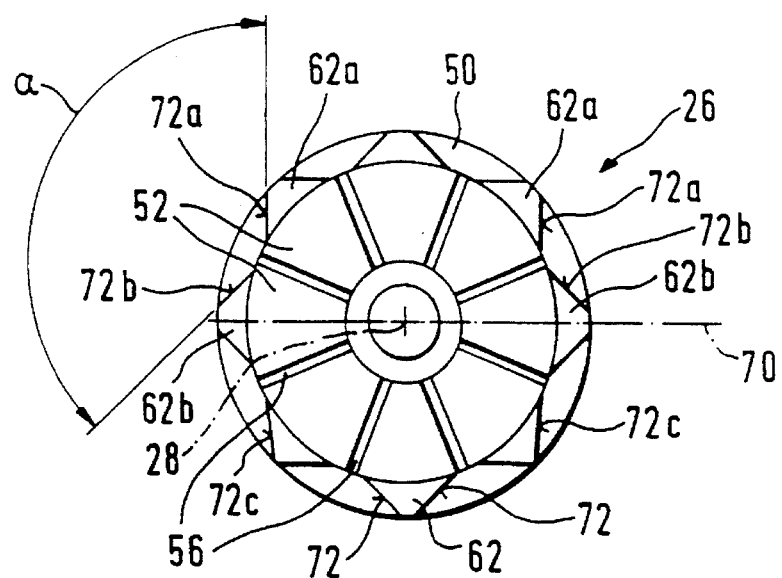

FIG. 3 shows a plan view of the rotor 26 in the direction of the longitudinal axis 28. The rotor 26 has a longitudinal center plane 70 containing the longitudinal axis 28 and extending through the center of two diametrically opposite segments 52 All portions 62 of the casing 50 which are arranged along the circumference of the segments 52 are identically constructed. The hooks 60 and the portions 62 of the casing 50 enclosing the latter are arranged centrally on the segments 52 as viewed in the circumferential direction. The lateral surfaces 72 of the portions 62 that face one another along the circumference of the rotor 26 are so arranged that they do not form any undercuts away from the longitudinal center plane 70 in directions normal to this longitudinal center plane 70. The lateral surfaces 72 of the portions 62 can be planar or curved. In the construction shown in FIG. 3 above the longitudinal center plane 70, the lateral surfaces 72a of the portions 62a adjoining the portions 62b through which the longitudinal center plane 70 passes, these portions 62a facing the lateral surfaces 72b of the portions 62b through which the longitudinal center plane 70 passes, extend vertically to the longitudinal center plane 70. However, as is shown in FIG. 3 below the longitudinal center plane 70, the lateral surfaces 72c can also be arranged in such a way that they extend at an increasing distance from the longitudinal center plane 70 to another center plane 74 extending through the rotor 26 vertically to the longitudinal center plane 70. Additional longitudinal center planes, each of which extends through the center of two oppositely located segments 52, can be situated through the rotor 26. The lateral surfaces 72 of the portions 62 also have no undercuts which extend away from these longitudinal center planes in directions normal to these longitudinal central planes. In the embodiment example with eight segments 52 which is shown in the drawing, the lateral surfaces 72 of the portions 62 are constructed in a planar manner and in each instance enclose between an angle a of approximately 135° two lateral surfaces 72 of two adjacent portions 62, which lateral surfaces 72 face one another.

For fabrication of the casing, the rotor 26 is placed in an injection molding die, not shown, which is divided in the longitudinal center plane 70. The rotor 26 can be removed from the die in a simple manner since the casing has no undercuts vertically away from the longitudinal center plane 70 in the removal direction of the rotor.

I claim:

1. Unit for feeding fuel from a supply tank to an internal combustion engine having an electric motor (18) with a rotor (26) which has an armature (40) and a plan commutator (32) which are at least partially enclosed by a casing (50, 62) made of plastic, the plan commutator (32) having a plurality of segments (52) which are separated from one another by slots (56) extending along the longitudinal axis (28) of the rotor (26) and which are connected with the armature (40), the casing (50) extending in the direction of the longitudinal axis (28) of the rotor (26) only so far as not to cover the slots (56), characterized in that connection wires (60) for connecting with the armature (40) are arranged at the outer surfaces (54) of the segments (52), in that the casing (50) has portions (62) which extend in the direction of the longitudinal axis (28) of the rotor (26) over the base of the slots (56) until the connection wires (60) are covered by the portions (62), and in that the portions (62) are so constructed that they have no undercuts away from a longitudinal center plane (70) containing the longitudinal axis (28) of the rotor (26) in directions normal to the longitudinal center plane (70).

2. Unit according to claim 1, characterized in that each segment (52) has a hook (58) which is bent in a U-shaped manner and projects outward, the connection wires (60) being arranged at these hooks (58), and in that the connection wires (60) and the hooks (58) are covered by the portions (62) of the casing (50).

3. Unit according to claim 1, characterized in that the portions (62) of the casing (50) extend approximately parallel to the longitudinal axis (28) of the rotor (26).

4. Unit according to claim 1, characterized in that the longitudinal center plane (70) extends through two portions (62b) situated diametrically opposite one another.

5. Unit according to claim 4, characterized in that the lateral surfaces (72a) of the portions (62a) adjoining the portions (62b) through which the longitudinal center plane (70) passes, these portions (62a) facing the lateral surfaces (72b) of the portions (62b) through which the longitudinal center plane (70) passes, extend roughly vertically to the longitudinal center plane (70).

6. Unit according to claim 4, characterized in that the lateral surfaces (72a) of the portions (62a) adjoining the portions (62b) through which the longitudinal center plane (70) passes, these portions (62a) facing the lateral surfaces (72b) of the portions (62b) through which the longitudinal center plane (70) passes, extend at an increasing distance from the longitudinal center plane (70) to another center plane (74) vertical to the longitudinal center plane (70).

* * * * *